B. A. ARATA AND T. L. MATTIE.
CUSHIONED BEDPAN.
APPLICATION FILED SEPT. 14, 1920.
1,382,593.
Patented June 21, 1921.
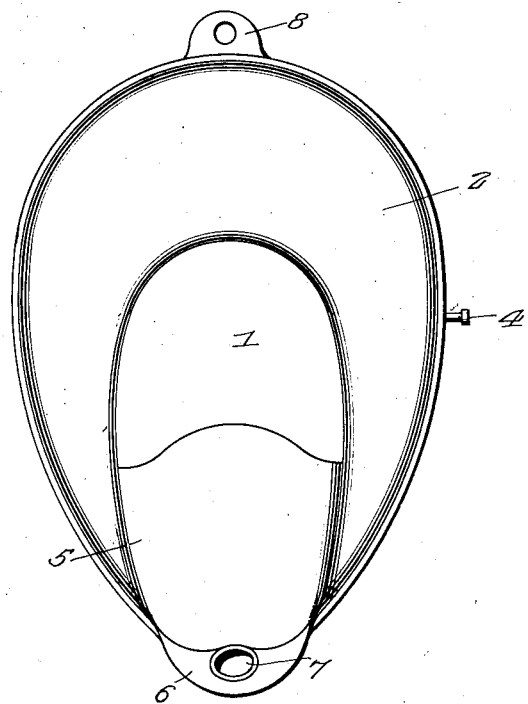
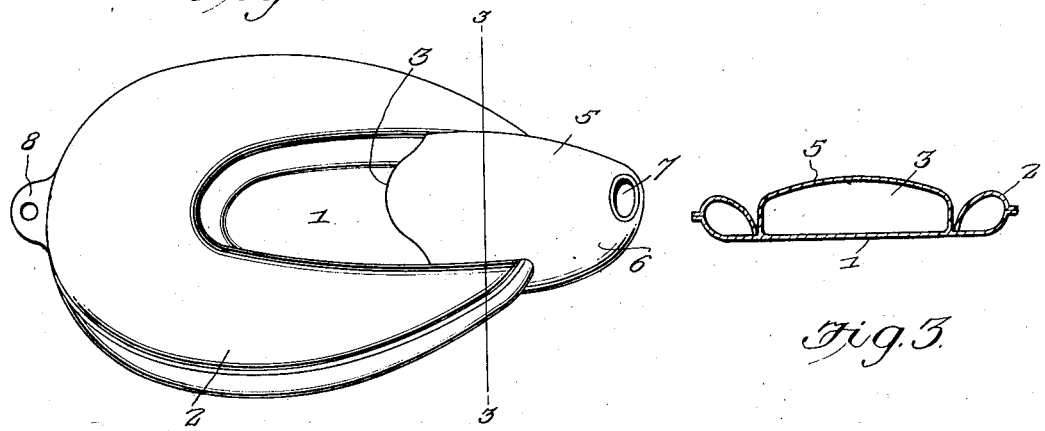

UNITED STATES PATENT OFFICE.

BERTHA A. ARATA AND THEODORA L. MATTIE, OF LOS ANGELES, CALIFORNIA.

CUSHIONED BEDPAN.

1,382,593.      Specification of Letters Patent.    Patented June 21, 1921.

Application filed September 14, 1920. Serial No. 410,091.

*To all whom it may concern:*

Be it known that we, BERTHA A. ARATA and THEODORA L. MATTIE, citizens of the United States, residing at Los Angeles, in the county of Los Angeles and State of California, have invented new and useful Improvements in Cushioned Bedpans, of which the following is a specification.

The object of our present joint invention is the provision of a bed pan of the cushioned type, and one of such construction that after use it may be conveniently handled and discharged of its contents and may as readily be cleaned in a thorough manner.

To the attainment of the foregoing, the invention consists in the improvement as hereinafter described and definitely claimed.

In the accompanying drawing, hereby made a part hereof:

Figures 1 and 2 are perspectives of our novel bedpan.

Fig. 3 is a transverse section taken in the plane indicated by the line 3—3 of Fig. 2 and showing the arched overhanging wall of the forward receptacle of the pan.

Similar numerals of reference designate corresponding parts in all of the views of the drawings.

Our novel bed pan may be formed in whole or in part of rubber in the discretion of the manufacturer, and it comprises a bottom wall 1, a cushion 2 and a forward receptacle 3. The bottom wall 1 is generally tapered toward the forward end of the hand, and the cushion is of general U-shape, is superimposed upon the rear and side portions of the bottom wall 1, and has its side arms tapered forwardly, so that its portions at opposite sides of the receptacle 3 are comparatively narrow. The said cushion 2 is preferably, though not necessarily, an inflatable or pneumatic cushion, and is therefore equipped with an inflating valve 4. The forward receptacle 3 is formed between the forward portion of the bottom wall 1 and an arched wall 5 that is joined to the bottom wall and is entirely open at its rear end to the inclosure within the cushion 2, and has a forward end wall 6 in which is a discharge aperture 7, designed when deemed expedient, to be closed by a stopper, not illustrated.

At the rear end of the bottom wall 1, said wall is preferably provided with an apertured pad 8, designed to serve as a convenient hanger-up.

In the practical use of our novel bed pan it will be manifest that the pan will subject the patient to no discomfort whatever; also, that the receptacle 5 will serve to hold the contents of the pan, and when the aperture 7 is stoppered, the pan may be carried conveniently in an upright position without danger of spilling any of the contents, and when the stopper is removed, the receptacle may be conveniently discharged of its contents and may then be quickly and thoroughly cleansed.

The bed pan is manifestly susceptible of use without closing the aperture 7, which is located considerably above the plane of the bottom wall 1, and we therefore do not desire to be understood as confining ourselves to the use of a stopper in connection with the pan.

Having described our invention, what we claim and desire to secure by Letters Patent, is:

A bed pan comprising a bottom wall generally tapered toward its forward end, a U-shaped cushion superimposed upon the rear portion and side portions of the bottom wall and having its arms tapered forwardly, an arched wall interposed between the forward end portions of the cushion and joined to the bottom wall, and a front wall joined to the bottom wall and said arched wall and having a discharge aperture; the said arched wall and front wall serving in conjunction with the bottom wall to form a receptacle in communication with said aperture and the rear end of the said receptacle being entirely open to the inclosure within the cushion.

In testimony whereof we affix our signatures.

BERTHA A. ARATA.
THEODORA L. MATTIE.